(12) United States Patent
Liu et al.

(10) Patent No.: US 7,959,133 B2
(45) Date of Patent: Jun. 14, 2011

(54) GRID FALLING FILM DEVOLATILIZER

(76) Inventors: Zhaoyan Liu, Beijing (CN); Jingyun Shi, Beijing (CN)

(*) Notice: Subject to any disclaimer, the term of this patent is extended or adjusted under 35 U.S.C. 154(b) by 1128 days.

(21) Appl. No.: 10/578,758

(22) PCT Filed: Oct. 21, 2004

(86) PCT No.: PCT/CN2004/001194
§ 371 (c)(1),
(2), (4) Date: Dec. 11, 2006

(87) PCT Pub. No.: WO2005/044417
PCT Pub. Date: May 19, 2005

(65) Prior Publication Data
US 2007/0164462 A1  Jul. 19, 2007

(30) Foreign Application Priority Data
Nov. 6, 2003  (CN) .......................... 2003 1 0103802

(51) Int. Cl.
*B01F 3/04* (2006.01)
(52) U.S. Cl. .................. 261/112.1; 261/114.5; 159/13.1
(58) Field of Classification Search ............... 261/112.1, 261/113, 114.1, 114.5; 159/13.1
See application file for complete search history.

(56) References Cited

U.S. PATENT DOCUMENTS

| | | | | |
|---|---|---|---|---|
| 1,276,690 A | * | 8/1918 | Pyzel | ............................ 202/158 |
| 2,061,007 A | * | 11/1936 | Potter et al. | ................. 261/114.1 |
| 2,624,401 A | | 1/1953 | Schilt | |
| 2,914,120 A | | 11/1959 | Hunt et al. | |
| 3,004,900 A | | 10/1961 | Hunt et al. | |
| 3,116,989 A | * | 1/1964 | Warren | ........................... 96/356 |
| 3,179,389 A | * | 4/1965 | Nutter | ........................ 261/114.1 |
| 3,262,684 A | * | 7/1966 | Smith | ........................ 261/114.1 |
| 3,311,676 A | | 3/1967 | Toekes | |
| 3,329,271 A | * | 7/1967 | Ward et al. | ..................... 210/150 |
| 3,367,638 A | * | 2/1968 | Leva | .............................. 261/113 |
| 3,866,049 A | | 2/1975 | Allington | |

(Continued)

FOREIGN PATENT DOCUMENTS
CA  2168630  2/1996
(Continued)

OTHER PUBLICATIONS

Xie Jianjun, Pan Qinmin, Pan Zuren "Progress on Polymer Devolatization", China Synthetic Rubber Industry, vol. 21, No. 3, pp. 135-141, May 15, 1998.

*Primary Examiner* — Scott Bushey
(74) *Attorney, Agent, or Firm* — Thomas J. Perkowski, Esq., P.C.

(57) ABSTRACT

A grid falling film devolatilizer including a tower housing, a liquid distributor for distributing liquid within the tower housing, and one or more internal towers arranged in the tower housing in a parallel manner, for continuously forming and regenerating a large surface of film material using liquid from the liquid distributor. Each internal tower has (i) a round, square or rectangle cross section, (ii) four corners, (iii) four pillars standing at the four corners of the internal tower, respectively, and (iv) multiple grid trays supported within the internal tower and numbering between 2 to 500. Each pair of neighboring grid plates having an interval in the range of about 20 to 500 mm. Also, each grid tray includes a pair of beams, a plurality of grid bars and corresponding guide members.

25 Claims, 4 Drawing Sheets

U.S. PATENT DOCUMENTS

| | | | |
|---|---|---|---|
| 3,928,300 A | 12/1975 | Hagberg | |
| 3,928,513 A * | 12/1975 | Leva | 261/113 |
| 3,966,538 A | 6/1976 | Hagberg | |
| 4,808,262 A | 2/1989 | Aneja et al. | |
| 4,932,468 A * | 6/1990 | Ayub | 165/118 |
| 4,934,433 A | 6/1990 | Aboul-Nasr | |
| 5,024,728 A | 6/1991 | Morita et al. | |
| 5,893,410 A * | 4/1999 | Halbrook | 165/118 |
| 6,105,663 A * | 8/2000 | Usui et al. | 165/115 |
| 6,877,726 B1 * | 4/2005 | Rindt et al. | 261/111 |
| 7,267,330 B1 * | 9/2007 | Fleming et al. | 261/114.1 |

FOREIGN PATENT DOCUMENTS

| | | |
|---|---|---|
| CN | 1089270 | 7/1994 |
| CN | 2209156 | 10/1995 |
| CN | 1089270 | 11/1998 |
| WO | WO 02/051606 | 4/2000 |

* cited by examiner

GRID FALLING FILM DEVOLATILIZER

RELATED CASES

This Application is a National Phase Entry Application of International Application PCT/CN2004/001194 filed Oct. 21, 2004 and published as WIPO Publication No. WO 2005/044417 A1 on May 19, 2005; which is a Continuation-in-Part of Chinese Application NO. 200310103802.7 filed Nov. 6, 2003; each said application being incorporated herein by reference.

FIELD OF THE INVENTION

The present invention relates to a gravity-driven falling film devolatilizer, in particularly, to a grid falling film devolatilizer with high specific surface in which film surfaces are continuously renewed.

BACKGROUND OF THE INVENTION

Devolatilization is an important process in the chemical industry for transferring volatiles from the liquid phase to the gas phase. The main ways of improving the efficiency of devolatilization include:
1. Increasing the temperature of the devolatilization system;
2. Decreasing the fractional pressure of the volatile component in the gas phase;
3. Increasing the interface between the gas phase and the liquid phase;
4. Regenerating the interface frequently.

The temperature of the devolatilization system is subject to the processing conditions; the decrease of fractional pressure of the volatile component in the gas phase may be achieved by controlling the operating pressure of the devolatilizer or by adopting inert gases as a carrier; while the enlargement of the gas-liquid interface and the regeneration of the interface mainly depend on the structure of the devolatilizer.

At present, there are many types of devolatilizers in industrial operation. Among them, an in-tube falling film devolatilizer and a down-flowing liquid column (droplet) devolatilizer may provide fairly large gas-liquid interfaces which, however, are hardly renewed, and the residence time is not controllable, and devolatilization efficiency may be influenced adversely due to the insufficient residence time. Horizontal devolatilizers with a single/double-shaft, multiple discs (meshes) stirrer, meanwhile, can effectively renew the interface to a certain extent and control the residence time by adjusting liquid level; however, their structures are excessively complex and fabrication and operation costs are high. To ensure film coverage, the liquid layer must be kept at a sufficient depth at the bottom of such devolatilizer, in which case the hydrostatic head will have a negative impact on the devolatilization efficiency.

DISCLOSURE OF INVENTION

A primary object of the present invention is to provide a novel grid falling film devolatilizer, which includes a large gas-liquid interface and effective film regeneration, and which is composed of thin film-like material, simple in structure and cost-effective to make and operate.

The novel grid falling film devolatilizer, according to the present invention, is a further modification and development of the previous Chinese Patent No. ZL97121654.1 of the same inventor, "A GRID PLATE TYPE POLYCONDENSATION TOWER FOR POLYESTER", but presents a distinctly different structure from the original polycondensation tower. It ensures film coverage in a wider range of viscosity and flow rate, features more stable performance and a wider variety of applications. It is considered to be the forerunner of a new generation of devolatilizers.

The novel grid falling film devolatilizer, according to the present invention, comprises: (1) a tower housing, (2) a liquid distributor, and (3) an internal tower. The tower housing is formed generally in the shape of a cylinder, but it may have a square or a rectangle cross-section when used in low pressure applications. It provides the desired temperature and pressure environment according to the devolatilization operation requirements. The tower housing includes a top cover (1-1), a tower body (1-2) and a tower bottom (1-3) which are connected via flanges; or, alternatively, the tower body and the tower bottom can be fabricated as an integral part. The top cover has a feeding inlet a and a gas discharging outlet c. The tower bottom has a material discharging outlet b. The top cover, the tower body and the tower bottom are covered by thermal insulation jackets or outer coils and are equipped with one or more pairs of HTM inlet d and outlet, e respectively. And besides the aforesaid nozzles, various instruments or other necessary connections may be installed.

The liquid distributor is disposed below the top cover or inside the upper portion of the tower body in connection with the feeding inlet, and performs the function of distributing the materials fed into the tower uniformly on the first grid tray. The internal tower generally has a square cross-section, while it may be rectangle or other shapes as well, and consists of pillars (3-1) and multiple grid trays (3-2). The tower internal performs the function of forming a large film surface of the materials and regenerating the film surface continuously. The internal tower may have four pillars which are generally made of a steel angle or other steel shapes and positioned at the corners of the square or rectangle cross-section of the internal tower. The hangers (3-1-1) provided on the upper part of the pillars (3-1) are mounted and fastened with bolts on the supporting brackets (1-2-1) fixed on the upper part of the tower body (1-2) so that the internal tower is mounted inside the tower housing in an easily removable manner. The locating blocks (3-1-2) are provided on the lower part of the pillars (3-1) and the matching stoppers (1-2-2) are provided on the lower part of the tower housing. This configuration limits the swing of the bottom of the internal tower while allowing the slide up or down of the internal tower inside the tower housing due to expansion or shrinkage of metallic materials as temperature varies.

The number of the grid trays in the internal tower is subject to the desired number of times of film renewal as per process requirements, which is generally 2 to 500 and preferably 5 to 200. Each grid tray comprises a pair of beams (3-2-1), a plurality of (at least two) grid bars (3-2-2) and corresponding guide members (3-2-3). A typical unit configuration of the pillars, beams, grid bars and guide members in a grid tray is shown in FIG. 2. The beams are located at opposite sides of the grid tray. Beams on the same grid tray are in the same horizontal plane, and are fixed to the pillars by welding or with bolts. Beams in two neighboring grid trays are arranged parallely or cross at 90°. The difference between the horizontal elevation of neighboring grid trays, referred to as layer interval, is usually in a range of 20 to 500 mm, preferably 40 to 250 mm, and the layer intervals between each neighboring grid trays may either be equal or not equal. The number of the grid bars in each grid tray is subject to the flow rate and viscosity of the devolatilization system, the dimension of the tower, and the perpendicularity of the grid bars to the beams.

Each grid tray may have single, double or multiple tiers of grid bars arranged horizontally and parallely. The grid bars may have a cross-section of triangle or reverse "V" shape formed by bending thin metal strips. Alternatively, they may adopt a circular or rhombic tube or have a cross-section in other shapes. The outmost grid bar is formed as an incline or a bent strip (3-2-2') which presents a larger vertical surface, and serves as a baffle for maintaining the liquid level in the grid tray. The grid bars are fixed on the beams by welding or inserting perforated beams.

The width and height of the grid bars are subject to (i.e. depend on) their rigidity: the longer the grid bars are, the larger the width and the height (mainly the height) of the grid bars should be. This ensures that the flexibility of the grid bars will not exceed the allowable range. The gap width between two neighboring grid bars, referred to as 'grid gap', is one of the crucial factors determining the devolatilization efficiency. Grip gap should be determined by calculation of parameters such as viscosity, surface tension, concentration of the volatile components in the materials, flow rate and operating pressure, etc., or by experiments. Under high viscosity and high flow rate circumstances, the grid bars can be arranged in two or more tiers in a grid tray to improve the throughput capacity. Meanwhile, the grid bars in upper and lower tiers may have the same or different width. When viscosity or gas content in the materials changes greatly in the devolatilizer, the width and/or the number of the grid bars in each tier should be adjusted gradually from top to bottom so as to change the gap width.

The guide member consists of the guide mesh (wires) (3-2-3-1) and the clamp (3-2-3-2) for fixation of the guide mesh (wires). The guide mesh (wires) may be metal wires, woven metal wire, metal sheet, perforated metal sheet, or expanded metal mesh that presents rhombus holes which may be formed by cutting and stretching metal sheet. If heat addition or removal is desired inside the devolatilizer, the guide mesh may employ a tube array as shown in FIG. 3. The tube array is formed by joining two corrugated sheets in a face-to-face manner and fixing them with butt welding, and introducing a heating or cooling medium thereinto. The guide mesh (wires) may be made from non-metal materials, such as plastics, etc. under lower operating temperature. The guide members are disposed between two neighboring grid bars and are parallel to the grid bars, the corresponding clamps are welded with the beams or inserted in perforated beams to fix them therein. The outmost clamps (3-2-3-2') are extended to be higher than others and serve as baffles for keeping the liquid level in grid tray; or, alternatively the guide mesh (wires) can be directly fixed under the grid bars without clamps.

For further increasing the flexibility of the devolatilization operation, the present invention provides an overflowing film-forming mechanism, in which the clamps are placed at two sides of the grid bar to constitute a grid funnel and the clamps act as overflow weirs. When the flow volume or viscosity of the liquid is low, the liquid level is lower than the top end of the clamps, the materials only flow downwards through the gaps between the grid bars, and the clamp and generate films along guide meshes (wires). When the flow volume or viscosity is increased, a portion of materials will overflow the clamp, flow down along the outer side of the clamp, and converge with the materials passing through the gap between the grid bar and the clamp to generate films along the guide mesh. With this arrangement, the devolatilizer can adapt to a wider range of flow volumes and viscosities, and higher operating flexibility is achieved.

In each grid tray, the materials pass through the grid gaps by gravity and generate films along the guide members, thereby obtaining high devolatilizating interface.

For the purpose of interface renewal, two neighboring grid trays may be arranged as per the following configurations:

Configuration A: The grid trays are arranged in the same direction, and the grid bars in upper and lower tiers are staggered by half a film interval or funnel interval:

1. The grid bars in each grid tray are arranged in one tier and in the same direction, as shown in FIG. 4;
2. The grid bars in each grid tray are arranged in two tiers and in the same direction, as shown in FIG. 5;
3. There are three alternative structures as follows for the overflowing film-forming mechanism in which grid trays are arranged in the same direction:
   a) The grid bars in each grid tray are arranged in two tiers, the grid funnel is located in the lower tier, and the width of the grid bars in the upper tier is no less than the interval between the two grid funnels thereunder, as shown in FIG. 6;
   b) The upper grid bar tier is eliminated, and the interval between two neighboring grid funnels is less than the width of the grid funnel, as shown in FIG. 7;
   c) The upper grid bar tier is eliminated, and the lower portion of the guide meshes (wires) in neighboring grid funnels lean toward each other, as shown in FIG. 8.

Configuration B: Neighboring grid trays are arranged crosswise:

1. The grid bars in each grid tray are arranged in one tier, and grid bars in neighboring grid trays are arranged crosswise, as shown in FIG. 9;
2. The grid bars in each grid tray are arranged in two tiers, and grid bars in neighboring grid trays are arranged crosswise, as shown in FIG. 10;
3. For the overflowing film-forming mechanism in which neighboring grid trays are arranged crosswise, the grid bars in each grid tray are arranged in two tiers, and the width of the grid bars in upper tier is no less than the interval between two grid funnels thereunder, as shown in FIG. 11.

Configuration C: A hybrid Configuration based on Configurations A and B.

The devolatilizer provided by the present invention operates in the following manner:

The materials are fed into the tower through the feeding inlet a at the top of the tower, and fall onto the first grid tray uniformly through the liquid distributor, then pass through the grid gaps and generate films along the guide meshes (wires). The films are baffled by grid bars in the second grid tray, and materials pass through the grid gaps in the second grid tray and generate films along the guide meshes (wires) in the second grid tray. Once again, the films are baffled by grid bars in the third grid tray, and materials pass through the grid gaps in the third grid tray and generate films along the guide mesh. This continues until materials pass through the grid gaps in the lowermost grid tray and fall down to the tower bottom, and then leave the tower via the material discharging outlet b.

The gases which escape from the film surface during the process pass through the narrow space between the liquid films, rise upwards through the arc-shaped area between the tower housing (1) and the internal tower (3) and gather at the top of the tower, then leave the tower via the gas discharging outlet c.

The renewal of film surfaces in each grid tray is achieved as follows:

1. As described in connection with configuration A above, the liquid film descending along the guide mesh (wires) of the grid tray above falls right on the angular point of the grid bar of the grid tray beneath and thereby is split into two halves. The two adjacent halves that come from two neighboring films above respectively converge in the grid gap between them, and then pass through the grid gap, generating film along the guide mesh (wires). During said split and convergence process, two face-to-face surface layers of the two adjacent films above are brought into center part of the film beneath, while the center part of the film above emerges as the surface layers of two adjacent films beneath. Thus the renewal of film surface is achieved.

2. As described in connection with configuration B above, the liquid films in a grid tray are perpendicular to those in adjacent grid trays, thereby allowing for the materials to be mixed adequately through the length and breadth and the renewal of film surface to be achieved.

The grid falling film devolatilizer according to the present invention is applicable to the devolatilization of liquids whose viscosities range from 0.2 mPa·s to 2000 Pa·s and may be employed in a wide range of applications, such as petrochemical, specialty chemicals, pharmacy and food industries, etc. Compared with the conventional devolatilizer, the devolatilizer according to the present invention has the following advantages:

1. High devolatilization interface, providing larger devolatilizing area per unit volume of the materials;
2. Adequate interface renewal;
3. High operation flexibility and devolatilization efficiency;
4. Capable of a large variety of applications, can be used for the devolatilization of the materials with viscosity of 0.2 mPa·s to 2000 Pa·s;
5. No dead zones and no axial back mixing;
6. All the materials being in a form of thin film, so that eliminating the negative impact of hydrostatic head on the devolatilization efficiency;
7. Simple in structure, ease of maintenance, cost-effective fabrication and operation costs.

BRIEF DESCRIPTION OF THE DRAWINGS

The following best mode embodiment of the present invention should be taken in conjunction with the appended drawings, wherein.

BEST MODE EMBODIMENTS OF THE PRESENT INVENTION

Figure 1:
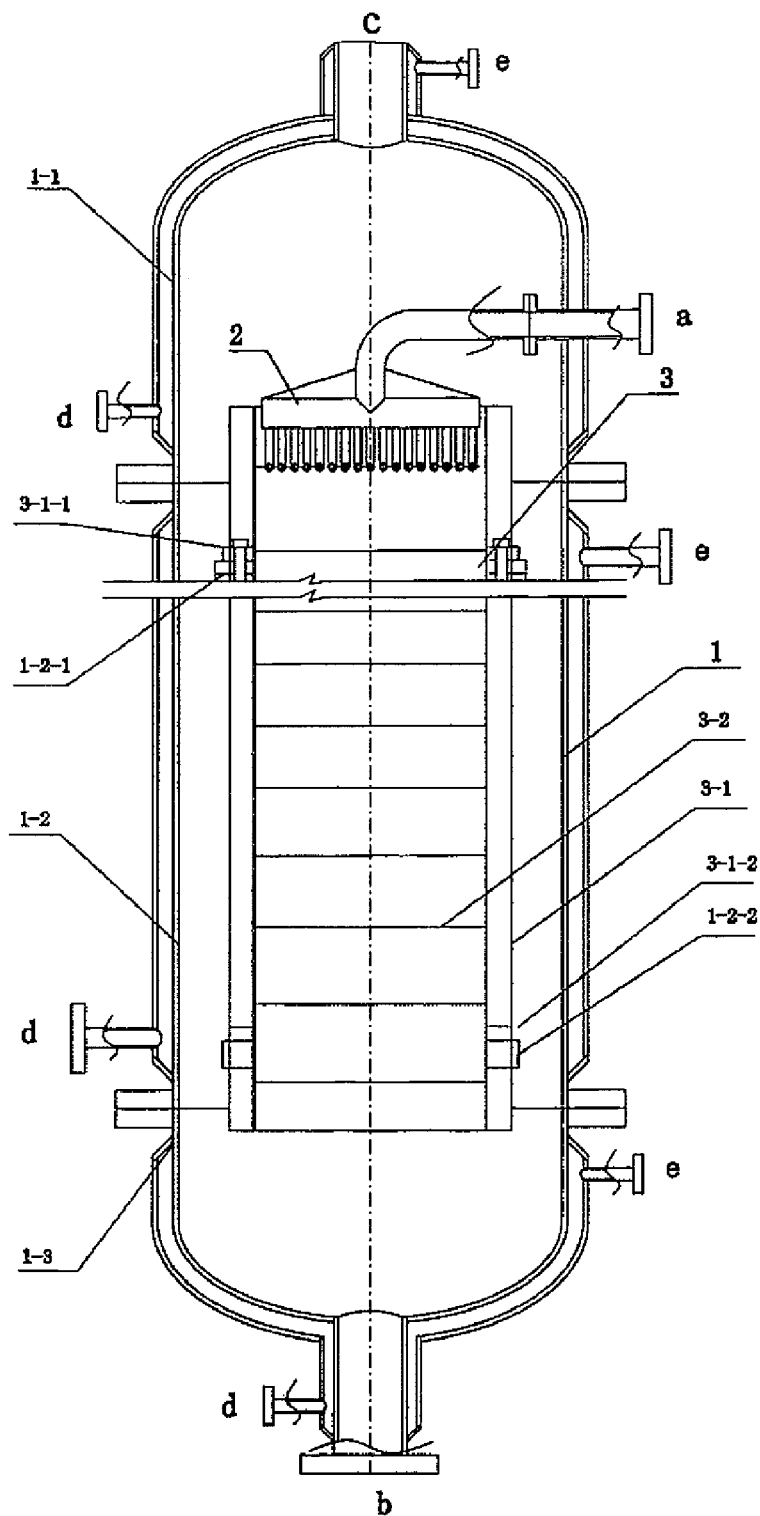
FIG. 1 is a structural section view of the grid falling film devolatilizer.
Figure 2:
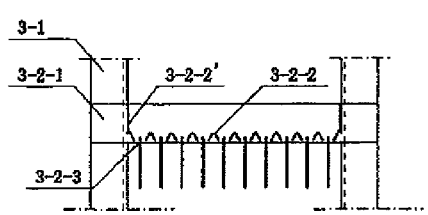
FIG. 2 is a schematic diagram showing the unit configuration of the pillars, beams, grid bars and guide members in a grid tray.
Figure 4:
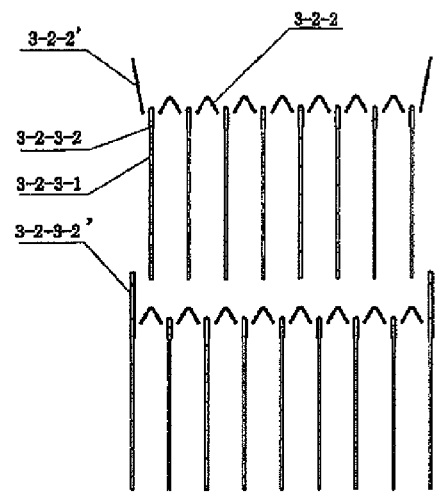
FIG. 4 is a structural schematic diagram showing the grid bars in each grid tray arranged in one tier and in the same direction.
Figure 3:
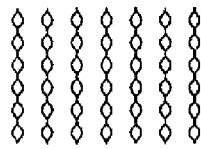
FIG. 3 is a schematic diagram of the guide mesh in the form of a tube array.
Figure 5:
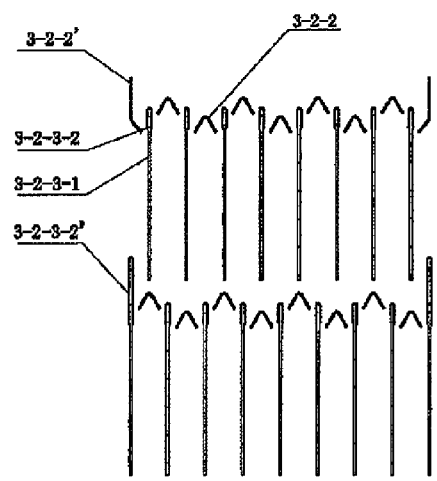
FIG. 5 is a structural schematic diagram showing the grid bars in each grid tray arranged in two tiers and in the same direction.
Figure 6:
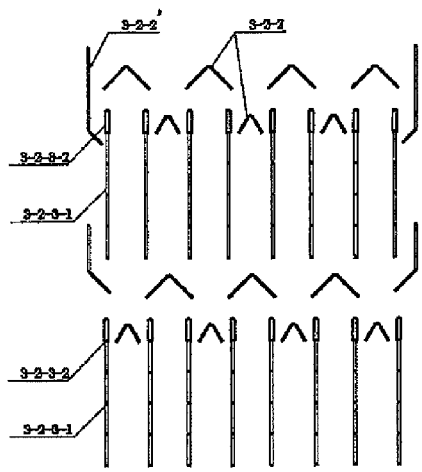
FIG. 6 is a structural schematic diagram showing an overflowing film-forming mechanism in which the grid bars in each grid tray are arranged in two tiers, the grid funnel is located in the lower tier and adjacent grid trays are arranged in the same direction.
Figure 8:
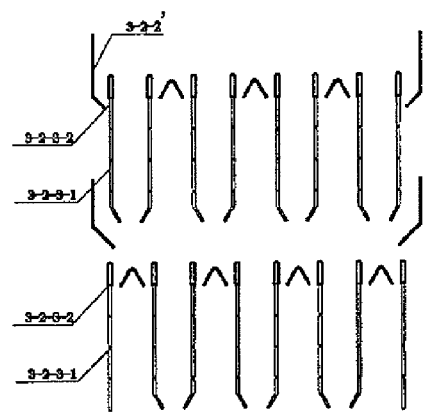
FIG. 8 is a structural schematic diagram showing an overflowing film-forming mechanism in which the grid bars in each grid tray are arranged in one tier, the adjacent grid trays are arranged in the same direction, and the lower portion of the guide meshes (wires) in neighboring grid funnels lean toward each other.
Figure 7:
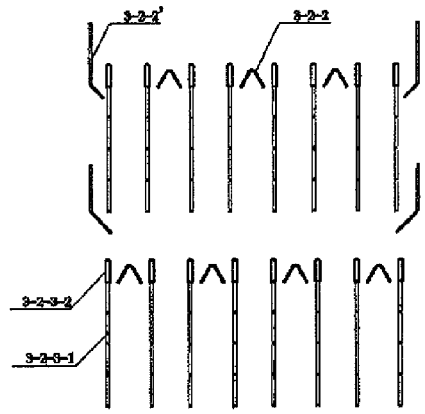
FIG. 7 is a structural schematic diagram showing an overflowing film-forming mechanism in which the grid bars in each grid tray are arranged in one tier, and adjacent grid trays are arranged in the same direction.
Figure 11:
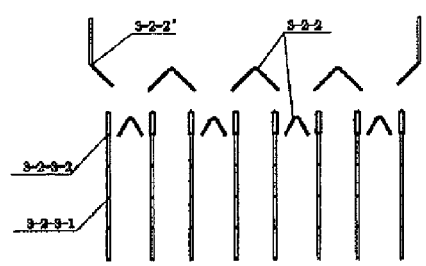
FIG. 11 is a structural schematic diagram showing an overflowing film-forming mechanism in which the grid bars in neighboring grid trays are arranged crosswise.
Figure 9:
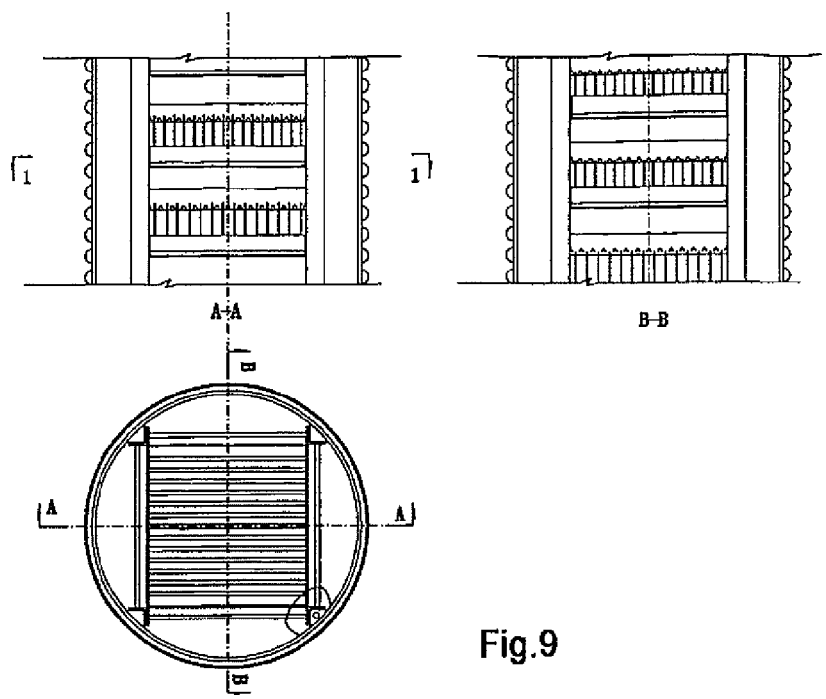
FIG. 9 is a structural schematic diagram showing the grid bars in each grid tray arranged in one tier, and the grid bars in neighboring grid trays arranged crosswise.
Figure 10:
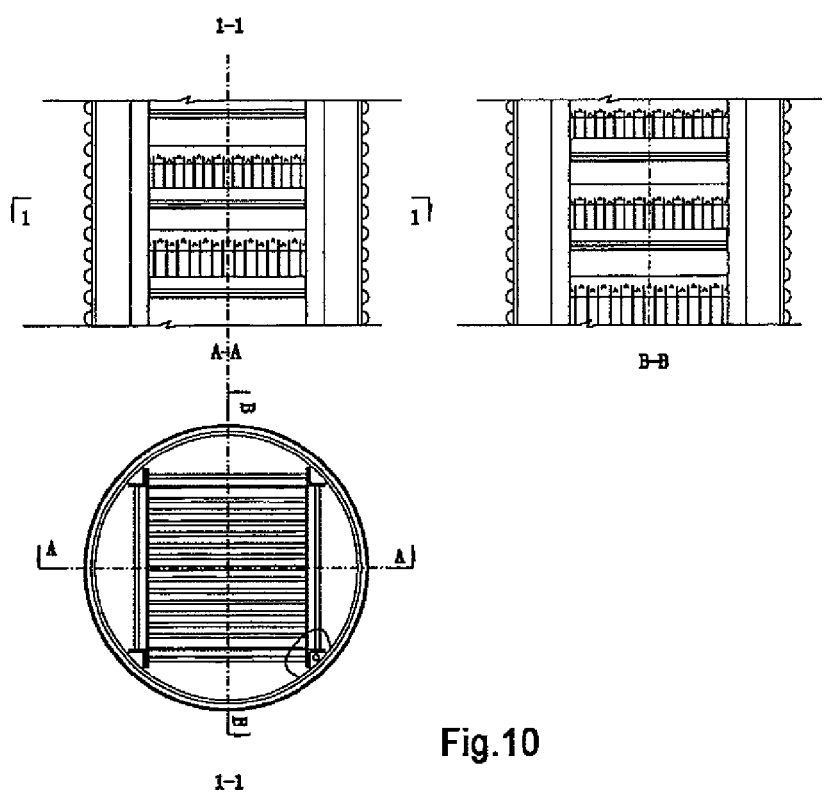
FIG. 10 is a structural schematic diagram showing grid bars in each grid tray arranged in two tiers, and the grid bars in neighboring grid trays arranged crosswise.

The following examples are provided to further illustrate the present invention, but the scope of claims of the present invention is not limited to the followed examples.

Example 1

Final Polycondensation Tower for High-Viscous Polyester

The tower has a diameter of 1600 mm and a height of 8000 mm. The internal tower has a size of 1000 mm×1000 mm×6000 mm and comprises 80 layers of grid trays which are arranged crosswise in an overflowing film-forming manner. The layer interval of the two uppermost grid trays is 15 mm and that of the bottommost grid trays is 37.5 mm. The pre-polymers introduced into the tower have an intrinsic viscosity of 0.3 and a temperature of 285° Celsius and a flow rate of 2,500 kg/hr. The pressure in the tower is 100 Pa. The intrinsic viscosity of polymer leaving the tower increases to 0.85.

Example 2

The Devolatilization of $CO_2$ from the Aqueous Solution of Ethylene Oxide

The devolatilization of $CO_2$ should be performed prior to the hydration reaction of ethylene oxide so as to prevent the erosion of the apparatus.

The degassing tower is 1600 mm in diameter, 7500 mm in height. The internal tower has a size of 620 mm×620 mm×5000 mm and comprises 80 layers of grid trays which arranged in a hybrid style as per the abovementioned Configuration C. The layer interval is 8 mm. The solution of ethylene oxide with 2% $CO_2$ is fed into the tower, and the temperature is 40° Celsius, the flow rate is 60,000 kg/hr. The pressure in the tower is 0.135 MPa. The $CO_2$ in the solution of ethylene oxide leaving the tower is removed completely.

What is claimed is:
1. A grid falling film devolatilizer comprising:
   a tower housing having a round, square or rectangle cross section;
   a liquid distributor for distributing liquid within said tower housing; and
   one or more internal towers arranged in said tower housing in a parallel manner, for continuously forming and regenerating a large surface of film material using the liquid supplied by said liquid distributor;
   wherein each said internal tower consists of pillars and multiple grid trays, and four pillars stand respectively at four corners of said internal tower which has a square or rectangle cross section, and wherein the number of said grid trays is from 2 to 500, and each pair of neighboring grid trays having a layer interval in the range of about 20 to 500 mm;

wherein each said grid tray includes a pair of beams, a plurality of grid bars and corresponding guide members;

wherein said beams are located at opposite sides of said grid tray, in a horizontal plane of same height, and are fixed to said pillars;

wherein said grid bars are fixed perpendicularly to said beams and are arranged in either single tier, double tiers or multiple tiers in a parallel manner;

wherein said grid bars have a cross-section of triangle, reverse "V" shape;

wherein said guide members include guide mesh and a clamp for fixation of said guide mesh and wherein said guide members are disposed at a grid gap between said two neighboring grid bars and parallel to said grid bars, and said corresponding clamps are fixed to said beams; and wherein the outmost grid bars in each said grid tray are formed as inclines or bent strips which present a larger vertical surface and serve as baffles for keeping liquid level in each said grid tray or the clamps of the outmost guide members in each said grid tray are extended so as to be higher than other said clamps and serve as baffles for keeping the liquid level in each said grid tray.

2. The grid falling film devolatilizer according to claim 1, wherein hangers are provided on the upper part of the pillars and supporting brackets are provided on the upper part of the tower housing; wherein said hangers are mounted on said supporting brackets and fastened with bolts, so that said internal tower is mounted inside said tower housing; and wherein locating blocks are provided on the lower part of said pillars and matching stoppers are provided on the lower part of said tower housing for limiting the swing of the bottom of said internal tower.

3. The grid falling film devolatilizer according to claim 1, wherein the number of said multiple grid trays is from 5 to 200 and said layer interval between two neighboring grid trays is from 40 to 250 mm.

4. The grid falling film devolatilizer according to claim 1, wherein said grid bars in two neighboring grid trays are arranged in a manner selected from the group consisting of: a) being arranged in the same direction but staggered by half a film interval; b) being crossed at 90 degrees; and c) being arranged in the same direction but staggered by half a film interval and being crossed at 90 degrees.

5. The grid falling film devolatilizer according to claim 1, wherein said guide meshes are woven metal wires, metal sheets, perforated metal sheets, expanded metal meshes, tube array or non-metal meshes; and wherein said guide meshes can be directly fixed below said grids, eliminating said clamps.

6. The grid falling film devolatilizer according to claim 5, wherein said tube array is formed by joining two corrugated sheets in a face-to-face manner and fixing them with butt welding, and introducing heating or cooling medium thereinto.

7. The grid falling film devolatilizer according to claim 1, wherein an overflowing film-forming mechanism is employed, wherein said clamps are placed at two sides of a grid bar to constitute a grid funnel and said clamps act as overflow weirs.

8. The grid falling film devolatilizer according to claim 7, wherein a grid bar is disposed above two adjacent clamps that belong to two neighboring grid funnels respectively, and the width of the said grid bar is no less than the interval between the two clamps thereunder; and wherein said grid funnels in two adjacent grid trays cross at 90 degrees, or alternatively are arranged in the same direction while the grid funnels are staggered by half an interval of said grid funnel.

9. The grid falling film devolatilizer according to the claim 7, wherein said grid funnels in two adjacent grid trays are arranged in the same direction but staggered by half an interval of grid funnel.

10. The grid falling film devolatilizer according to claim 1, wherein the grid bars in said grid trays are arranged in such a manner that width of grid gaps in said grid trays are gradually increased from top to bottom.

11. A grid falling film devolatilizer comprising:

a tower housing having a round, square or rectangular cross section;

a liquid distributor for distributing liquid within said tower housing;

one or more internal towers arranged in said tower housing in a parallel manner, for continuously forming and regenerating a large surface of film material using liquid from said liquid distributor;

wherein each said internal tower consists of pillars and multiple grid trays, and four pillars stand respectively at four corners of said internal tower which has a square or rectangle cross section; wherein the number of grid trays is 2 to 500, and each pair of neighboring grid trays having a layer interval in the range of about 20 to 500 mm; and wherein each said grid tray comprises a pair of beams, a plurality of grid bars and corresponding guide members.

12. The grid falling film devolatilizer of claim 11, wherein said beams are located at opposite sides of said grid tray, in a horizontal plane of same height, and are fixed to said pillars.

13. The grid falling film devolatilizer of claim 12, wherein said grid bars are fixed perpendicularly to said beams and are arranged in single tier, double tiers or multiple tiers in a parallel manner.

14. The grid falling film devolatilizer of claim 13, wherein said grid bars have a cross-section of triangle, reverse "V" shape formed by bending thin metal strips, circle or other shapes.

15. The grid falling film devolatilizer of claim 11, said guide members comprise guide mesh and a clamp for fixation of said guide mesh, and are disposed at a grid gap between the two neighboring grid bars and parallel to the grid bars, the corresponding clamps are fixed to the beams.

16. The grid falling film devolatilizer of claim 15, the outmost grid bars in said grid tray are formed as inclines or bent strips which present a larger vertical surface and serve as baffles for keeping liquid level in said grid tray; or the clamps of the outmost guide members in said grid tray are extended to be higher than others and serve as baffles for keeping the liquid level in said grid tray.

17. The grid falling film devolatilizer according to claim 11, wherein hangers are provided on the upper part of said pillars and supporting brackets are provided on the upper part of the tower housing; and wherein said hangers are mounted on said supporting brackets and fastened with bolts, so that said internal tower is mounted inside the tower housing; and locating blocks are provided on the lower part of the pillars and matching stoppers are provided on the lower part of the tower housing for limiting the swing of the bottom of the internal tower.

18. The grid falling film devolatilizer according to claim 11, wherein the number of the said multiple grid trays is in the range of from 5 to 200 and the layer interval between two neighboring grid trays is in the range of from 40 to 250 mm.

19. The grid falling film devolatilizer according to claim 11, wherein said grid bars in two neighboring grid trays are arranged in a manner selected from the group consisting of: a) being arranged in the same direction but staggered by half a film interval; b) being crossed at 90 degrees; and c) being arranged in the same direction but staggered by half a film interval and being crossed at 90 degrees.

20. The grid falling film devolatilizer according to claim 15, wherein said guide meshes are woven metal wires, metal sheets, perforated metal sheets, expanded metal meshes, tube array or non-metal meshes; and wherein said guide meshes can be directly fixed below the grids, eliminating said clamps.

21. The grid falling film devolatilizer according to claim 20, wherein said tube array is formed by joining two corrugated sheets in a face-to-face manner and fixing them with butt welding, and introducing heating or cooling medium thereinto.

22. The grid falling film devolatilizer according to claim 11, wherein an overflowing film-forming mechanism is employed, and wherein clamps are placed at two sides of a grid bar to constitute a grid funnel and said clamps act as overflow weirs.

23. The grid falling film devolatilizer according to claim 22, wherein one said grid bar is disposed above two adjacent clamps that belong to two neighboring grid funnels respectively, and the width of the said grid bar is no less than the interval between the two clamps thereunder; and wherein said grid funnels in two adjacent grid trays cross at 90 degrees, or alternatively are arranged in the same direction while the grid funnels are staggered by half an interval of said grid funnel.

24. The grid falling film devolatilizer according to the claim 22, wherein said grid funnels in two adjacent grid trays are arranged in the same direction but staggered by half an interval of grid funnel.

25. The grid falling film devolatilizer according to claim 11, wherein the grid bars in said grid trays are arranged in such a manner that width of grid gaps in said grid trays are gradually increased from top to bottom.

* * * * *